(12) United States Patent
Petrov et al.

(10) Patent No.: US 12,715,697 B2
(45) Date of Patent: Aug. 25, 2026

(54) CONVEYOR SYSTEM, MOTOR-ROLLER CONTROLLER AND METHOD FOR OPERATING A CONVEYOR SYSTEM

(71) Applicants: Dimitar Ivanov Petrov, Sofia (BG); Nikola Aleksandrov Yankov, Sofia (BG); Dimitar Hristov Suvandzhiev, Sofia (BG); Ivan Dimitrov Petrov, Sofia (BG); Kazuya Ichieda, Miki City (JP); Georg Malina, Düsseldorf (DE)

(72) Inventors: Dimitar Ivanov Petrov, Sofia (BG); Nikola Aleksandrov Yankov, Sofia (BG); Dimitar Hristov Suvandzhiev, Sofia (BG); Ivan Dimitrov Petrov, Sofia (BG); Kazuya Ichieda, Miki City (JP); Georg Malina, Düsseldorf (DE)

(73) Assignees: Kyowa Europe GmbH, Leichlingen (DE); Industrial Software, Sofia (BG)

( * ) Notice: Subject to any disclaimer, the term of this patent is extended or adjusted under 35 U.S.C. 154(b) by 83 days.

(21) Appl. No.: 18/955,213

(22) Filed: Nov. 21, 2024

(65) Prior Publication Data

US 2025/0083899 A1 Mar. 13, 2025

Related U.S. Application Data

(63) Continuation of application No. PCT/EP2023/062775, filed on May 12, 2023.

(30) Foreign Application Priority Data

May 23, 2022 (EP) .................................... 22174726

(51) Int. Cl.
*B65G 13/06* (2006.01)
*B65G 39/02* (2006.01)
(Continued)

(52) U.S. Cl.
CPC ............. *B65G 13/06* (2013.01); *B65G 43/00* (2013.01); *G05B 19/4062* (2013.01); *H02P 5/68* (2013.01);
(Continued)

(58) Field of Classification Search
CPC .......... H02P 5/68; H02P 29/032; H02P 23/00; H02P 25/03; B65G 39/02; B65G 13/06;
(Continued)

(56) References Cited

U.S. PATENT DOCUMENTS

2012/0048682 A1 3/2012 Itoh et al.
2014/0021736 A1* 1/2014 Chenowth ............ H02H 7/0855 361/29
(Continued)

FOREIGN PATENT DOCUMENTS

EP 3100340 B1 4/2018
EP 3540547 A1 9/2019
(Continued)

OTHER PUBLICATIONS

Ibrahim A: "Using Zigbee to build a web-based DCS system", 2012 IEEE Power and Energy Society General Meeting ; San Diego, California, USA; Jul. 22-26, 2012, IEEE, Piscataway, NJ, Jul. 22, 2012 (Jul. 22, 2012), pp. 1-8, XP032393919, DOI: 10.1109/PESGM.2012.6343966; ISBN: 978-1-4673-2727-5.
(Continued)

*Primary Examiner* — James R Bidwell

(57) ABSTRACT

Method for operating a motor-roller controller wherein a first value indicative of an amperage at an input power port of a first motor-roller controller is measured by a meter of the first motor-roller controller. The first value is sent to at least one second motor-roller controller via a signal bus port of the first motor-roller controller. At least one second value indicative of an amperage at an input power port of the at
(Continued)

least one second motor-roller controller is received at the signal bus port. A nominal value for the amperage at the input power port of the first motor-roller controller is determined depending on the first value and the at least one second value, and the motor-roller control port of the first motor-roller controller is operated with an output current to the motor-roller such that the amperage at the input power port reaches the nominal value.

20 Claims, 4 Drawing Sheets

(51) Int. Cl.
*B65G 43/00* (2006.01)
*G05B 19/4062* (2006.01)
*H02P 5/68* (2006.01)
*H02P 25/03* (2016.01)

(52) U.S. Cl.
CPC ...... *B65G 39/02* (2013.01); *B65G 2203/0291* (2013.01); *H02P 25/03* (2016.02)

(58) Field of Classification Search
CPC . B65G 43/00; G05B 19/4062; G05B 19/4189
See application file for complete search history.

(56) References Cited

U.S. PATENT DOCUMENTS

2014/0277698 A1* 9/2014 Combs .............. G05B 19/4189 198/460.1
2015/0360879 A1* 12/2015 Kanaris ................. B65G 13/08 198/500
2017/0338754 A1* 11/2017 Forster ...................... H02P 6/15
2021/0171288 A1 6/2021 Hampe et al.

FOREIGN PATENT DOCUMENTS

EP 3614555 A1 2/2020
EP 4080302 A1 * 10/2022 ......... G05B 19/4189
JP 2001192112 A 7/2001
JP 2019031397 A 2/2019
JP 2021066580 A 4/2021

OTHER PUBLICATIONS

Lee Hong-Jun et al: “Consensus Based Parallel Operation of Electric Motors Ensuring Speed Regulation and Load Torque Sharing”, International Journal of Control, Automation and Systems, Korean Institute of Electrical Engineers, Seoul, KR, vol. 19, No. 9, Sep. 1, 2021 (Sep. 1, 2021), pp. 3111-3121, XP037553660, ISSN: 1598-6446, DOI: 10.1007/S12555-020-0609-0 [retrieved on Sep. 2, 2021].

Egelin Bryce et al: “Centralized vs. Decentralized: Choosing the Right Type of Motor Control System”, Power Transmission Engineering, Aug. 1, 2020 (Aug. 1, 2020), pp. 34-36, XP093053878, Retrieved from the Internet: URL:https://www.powertransmission.com/ext/resources/issues/ 0820/motor-control.pdf 1646352070 [retrieved on Jun. 13, 2023].

Rosner Jim: “Distributed Logic for Control in Motor Management Relays”, May 13, 2021 (May 13, 2021), pp. 1-7, XP093054192, Retrieved from the Internet: URL:https://www.machinedesign.com/mechanic al-motion-systems/article/21164180/distributed-logic-for-control-in-motor-management-relays; [retrieved on Jun. 14, 2023] the whole document.

* cited by examiner

CONVEYOR SYSTEM, MOTOR-ROLLER CONTROLLER AND METHOD FOR OPERATING A CONVEYOR SYSTEM

CROSS-REFERENCE TO RELATED PATENT APPLICATIONS

This patent application is a continuation of International Application No. PCT/EP2023/062775, filed on May 12, 2023, which claims the benefit of priority to European Patent Application No. 22174726.4, filed May 23, 2022, the entire teachings and disclosures of both applications are incorporated herein by reference thereto.

FIELD OF THE DISCLOSURE

The subject matter relates to a method for operating a motor roller controller, in particular for a conveyor system, for instance for conveying goods, packages and the like. Moreover, the subject matter relates to conveyor systems with motor-driven conveyors driven by motor-rollers. The subject matter further relates to a motor-roller controller within such a conveyor system.

BACKGROUND OF THE INVENTION

Motor-driven conveyor-rollers, a.k.a. motor-rollers, comprise a roller body rotatably mounted about a roller axis. The roller body usually is a hollow tube. Within the roller body, the motor is arranged. The motor is an electric motor which is configured to generate a rotational movement about the roller axis between the axis and the roller body.

For the sake of understanding, in the following the term motor-roller can be used for the motor within the roller body alone, a drive unit comprising the motor and a corresponding control circuit for the motor within the roller body or the roller body comprising the motor or the drive unit. In the following the term motor can be used for the motor as such as well as the drive unit comprising the motor as such and a corresponding control circuit for the motor.

It is well known that motor-rollers are operated by a control unit, also known as controller, being arranged external, outside the roller body. The controller exchanges control signals with the motor inside the roller body.

Motor-driven conveyors driven by motor-rollers of this type are used in conveyor systems. In such conveyor systems, a single motor-rollers is used to operate several roller bodies within a conveyor zone. Conveyor systems oftentimes have several conveyor zones through which an object to be conveyed passes one after the other. As has been said, within each conveyor zone, at least one motor-driven conveyor-roller operates several rollers.

A controller has a wired power inlet (input power port) for receiving electric power, preferably DC power. However, the input power port may also be an AC port, in this case, on the controller there may be arranged a rectifier for converting the input AC power to DC power. Moreover, the controller has a wired motor-roller control port. The wired motor-roller control port is configured to provide the motor-roller with drive power. The motor can be fed through the motor-roller control port using for instance a pulse width modulation (PWM) signal to control at least the rotational speed of the motor. In addition, status information and control signals can be exchanged between the motor-roller and the controller using the motor-roller control port. Status information and/or control signals can, inter alia, include actual motor speed, set motor speed, actual conveyor speed, set conveyor speed, actual rotational direction, set rotational direction, actual operation mode, set operation mode, temperature, error messages, gear ratio of the motor gear, serial number, article number, production date and or the like. In particular, the motor-roller control port is a four wired motor-roller control port in line with EP 3 100 340 B1.

A conventional controller comprises a wired I/O (Input/Output)-port. This I/O-port is configured to exchange control information with a central control center for instance a central PLC (SPS)-control. The I/O-port can, for instance, be configured using a proprietary protocol. However, the I/O-port can also be configured using standardized I/O-protocols, for instance according to CAN, DeviceNet, Ethernet Powerlink, INTERBUS, Fieldbus, LIN, M-Bus, PROFIBUS, VARAN and the like. In addition to such a conventional controller, a wireless controller is know, which operates similar to the wired controller. The explanation for the wired and the wireless controllers can be used for both, with the exception that the I/O Bus or the wireless controller is a wireless bus, with appropriate wireless protocols.

The controller is configured to exchange motor-roller control signals with a motor-roller at the motor-roller control port, to exchange motor-roller status signals with the motor-roller at the motor-roller control port and to exchange motor-roller control signals for the motor-roller with a central control at the I/O-port. Exchange of the relevant control and status signals are well known and need no further description. It should be noted that all of the ports an inlets of the wired controller are preferably wired ports, requiring wiring between the motor-roller and the controller and be the controller and centralized control center. Wiring usually is necessary to provide stable communication in industrial environments. A wireless controller has also a wiring with the motor-roller and the power inlet, however, a wireless I/O port.

For the sake of understanding, the motor-roller controller, a.k.a. controller, may be arranged for controlling motor-rollers. As such, within the controllers, at least one microprocessor may be provided for operating the motor-rollers within a conveyor system and more particular for operating at least one motor-roller within a conveyor system.

Conveyor systems usually are constructed with several conveyor zones. That is, one conveyor zone is followed by the next conveyor zone. Within each conveyor zone at least one, preferably only one motor-roller is provided. At least two spatially neighboring motor-rollers may also be operated by a single motor-roller controller.

Preferably, every motor-roller or at least every second is controlled by a separate motor-roller controller. The motor-roller controllers are connected to each other and with a central controller using a serial bus.

The controllers of a conveyor system are powered by central power supplies. The power supply is preferably DC, however, the subject matter also relates to AC power supplies, where possible. In a typical conveyor system, in particular where human interaction is involved, the power supply has low voltage. Low voltage in this sense can be understood as being voltages below 100V, in particular below 50V, for instance 48V, 24V or 12V. In order to provide sufficient power for the motors, higher supply currents are required. These high currents require, in order to keep Ohmic losses in the supply lines low, cross-sections of the supply cable to be greater than, for instance 1.5 $mm^2$, in particular greater than 2.5 $mm^2$, 4 $mm^2$. These higher cross-sections require more metal per meter cable, increasing the cost of the cable. In order to keep cost low, the cabling is calculated with the minimum requirement. However, the Ohmic losses result in voltage drops along the supply line, i.e. from the power supply to the controller. In a situation with a high power demand this can result in under voltages at a controller and thus at the motor connected to this controller. The under voltage may case the controller and/or the motor to malfunction. The under voltage issue is solved usually according to prior art by issuing an error signal from the controller or by a momentary stop of the controlled motor. Both of these solutions cause negative side effects on the overall system. Looked at the system integration perspective the issue is annoying and irritating.

Moreover, conveyor systems usually are equipped with power supplies having current ratings that satisfy the most reasonable cases of operation. However, there are cases with higher current requirements, i.e. when the goods to be transported are heavier than expected during design of the conveyor system, which result in overcurrents and thus activation of a power supply protection. This will also lead to malfunctions in the conveyor system.

SUMMARY OF THE INVENTION

The above definitions and descriptions can be understood to be part of the following disclosure, i.e. they form integral part of the subject-matter as claimed.

In order to improve system availability and to overcome the problem with under voltages and/or overcurrents, the subject matter relates to a method of claim 1.

A conveyor system is in particular arranged for conveying goods, packages and the like along a conveying line. A conveying system may be comprised of at least two conveying zones, each of which is actuated using one motor-roller. For the sake of understanding, the terms conveyor, conveyor zone or conveyor line can be understood as synonyms. A conveyor system may be comprised of at least two conveyor zones. A conveying zone may be comprised at least one motor-roller and at least two, preferably six or more passive rollers. A motor-roller and a passive roller are each comprised of a preferably cylindrical tube being rotatably connected to a rack via an axis. By actuating the motor-roller, the passive rollers are also actuated and rotated in a desired direction.

In order to operate a motor-roller, a motor-roller controller is required. The motor-roller controller is arranged for empowering the motor-roller with electrical power and moreover for controlling the action of the motor-roller, in particular for controlling start/stop, direction, torque, number of revolutions, number of revolutions per minute (RPM). Moreover, the motor-roller controller can be arranged for sensing motor-roller status. Empowering the motor-roller and/or sensing a motor-roller status may be accomplished using the motor-roller control port of the motor-roller controller. The motor-roller is wired to the motor-roller controller along the motor-roller control port. Thus, the motor-roller control port of the motor-roller controller is a wired port. In order to operate a plurality of motor-roller controllers, the motor-roller controllers are in turn connected to a control bus. Conventional systems are comprised of a plurality of motor-roller controllers each of which being connected to a wired control bus.

Now, there is proposed a method for operating a motor-roller controller.

When operating the motor, the controller draws current from the input power port, e.g. a power inlet as described above. The current is provided to the input power port through a cabling. The cabling can connect two or more controllers to a common power supply. The cabling has at least two wires. At the input power port, a first value indicative of an amperage at the input power port of the first motor-roller controller is measured. As such, there can be provided, at the input power port, preferably as part of the controller, meter indicating a current, i.e. an ampere meter. The meter is arranged for sensing information indicative of the amperage at the input power port. The meter may put out a first value being indicative of the sensed amperage. Indicative may also be understood as representative. The term meter can be understood as measurement sensor. The terms metering, measuring, determining, sensing or obtaining can be used interchangeably.

In the system according to the subject matter, at least two controllers are connected to a common power supply. The controllers which are connected to the power supply may communicate with each other via the signal bus port. The signal bus port may be an I/O port or other communication port, in particular a communication port of the respective controller. The term signal bus port can be understood a port for communication on a signal bus. A signal bus can be any type of bus, used for communication. The controllers may be connected to such a bus for communication. Communication may be a direct, bidirectional communication between the controllers or an indirect communication via a communication hub. The signal bus port may be the I/O port as described above or any other communication port. The terms communication, sending, transmitting, receiving can be used interchangeably. In particular a value can be send, transmitted, communicated. This includes polling and/or pushing data between the communication partners.

After the first value has been obtained, the controller may send out this value. According to an aspect, the first value is communicated to at least one second controller. The first value can also be sent to a central controller. The at least one second controller may be constructed and operated identically or at least similar to the first controller, thus the description of the first controller applies to the second controller and preferably any other controller along a conveyor line or conveyor system as well.

A second value indicative of an amperage at an input power port of the at least one second motor-roller controller may be measured in the second motor-roller controller. The second value may be send from the second controller. As said, first and second controllers may operate similar, in particular with regard to the measuring and sending of the first/second values.

The second value may be received in the first motor-roller controller, in particular at the signal bus port. The second value may be received in a central controller. For instance, all controllers along a conveyor line or in a conveyor system may meter and transmit their first values. Moreover, these first values can be received in other controllers as the second value. A controller thus is aware of its own first value and the first values of other controllers being received as second values. The term first and second are only used to improve legibility of the claim. Sending and/or receiving a value can be understood as sending and/or receiving data indicative of a value.

In a controller, not only one first value may be obtained, but it is preferred that a controller obtains a plurality of first values at different instances in time, e.g. on a regular basis or triggered by an event. In a controller, not only one second value may be received, but it is preferred that a controller receives a plurality of second values at different instances in time, e.g. on a regular basis or triggered by an event. The controller may be any of the motor-roller controllers or a central controller.

A controller may populate a list with first and second values together with information indicative of a time in order to enable the controller to calculate a sum of one first and the second values at a certain instance in time or within a certain time interval. This sum may be indicative of an overall amperage of the controllers at the power supply common to these controllers. These controllers may be connected to the same power supply.

In order to allow the conveyor system to operate flawless in most conditions, in particular in conditions when high amperages are required at certain controllers for certain times, it is now proposed that a nominal value for the amperage at the input power port of the first motor-roller controller is determined depending on the first value and the at least one second value. A controller usually has a required maximum current to operate flawless. The nominal value may impose a limit to such a maximum current. Thus, the current available for the motor may be reduced to the nominal value, even if the motor would require higher currents.

It is to be noted that a controller may control a motor such that the motor draws a certain current from the motor roller controller port. The current at a motor roller controller port may depend on the impedance of the motor. The impedance of the motor may depend on the torque of the motor. The controller may control the motor such that the motor draws only the nominal value of current.

The nominal value can be understood as a setpoint or as an indication for the amperage of the controller at the input power port. The nominal value may be determined within the controller or outside the controller. The term determine may be understood as calculated, computed or obtained.

The nominal value may be determined for each controller along a conveyor line individually. The nominal value may be determined for more than one controller of a plurality of controllers along a conveyor line commonly. The nominal value can be understood as a setpoint or as an indication for the amperage of the controller at the motor-roller control port. The nominal value can be understood as a setpoint or as an indication for the amperage of the motor within the motor-roller. The nominal value can be determined within one or any of the motor-roller controllers or a central controller. The nominal value may be sent from one motor-roller controller to another motor roller controller via the bus or from a central controller to any one of the motor roller controllers.

For instance, for a certain time or time interval, in particular for the instant time, the controller may take into account the instant measured first and received second values to determine the nominal value. For instance, for a certain time or time interval, in particular for the instant time, a central computer may take into account the instant first value and second values to determine the nominal value for a particular controller.

After the nominal value for the first controller has been determined, the motor-roller control port of the first motor-roller controller is operated with an output current to the motor-roller such that the amperage at the input power port reaches the nominal value. The motor is controlled in such a way that it draws current from the motor-roller control port in-line with the nominal value. The current drawn at the motor-roller control port may be different than the nominal value, still, however, the change of amperage from the instant current is towards the nominal value, i.e. when the nominal value is lower than the instant current, the amperage of the motor is reduced.

According to an embodiment, the first value indicative of an amperage at the input power port of the first motor-roller controller is determined at the motor-roller control port of the first motor-roller controller. Rather than measuring at the input power port of the controller, the amperage may as well be measured at the motor-roller control port. The motor roller is empowered from the controller at the motor-roller control port. The current drawn by the controller from the input power port is mainly the current provided to the motor at the motor-roller control port. Only a small amount of power is consumed in the controller itself. Thus, the current at the motor-roller control port may also be indicative of the current at the input power port. The same applies for the second value indicative of an amperage at the input power port of the second motor-roller controller. It can also be determined at the motor-roller control port of the second motor-roller controller.

According to an embodiment, information representative of a membership of the first motor-roller controller to a common group, in particular a group ID of the common group, is assigned to the first motor-roller controller. As explained above, at least two or more controllers may be connected to a common power supply. The controllers connected to a common power supply may form a group. In particular controllers connected electrically in parallel with a common power supply may form a common group. It may also be possible, that controllers along a common cabling belong to a common group, wherein in parallel thereto, a second group of controllers can be connected to the same power supply, however, using a separate cabling.

An undervoltage may be caused by a voltage drop along the cabling. When grouping more than one controller into a common group, it may be possible to determine the amperage along the cabling of this common group. The information representative of the group may be used by the controllers within the group to determine whether received second values are relevant or not. Only those second values may be used, which stem from controllers of the same group as the receiving controller. Both the first and the at least one second motor roller controllers may be assigned the information representative of the group.

The information representative of a membership can be a group identification (ID). The information representative of the membership may be a numerical or alphanumerical value. The information representative of the membership may as well be understood as information representative of a group.

The information representative of a membership can be assigned to a controller manually, e.g. during first installation, e.g. using DIP switches. It may also be possible that, using the I/O port, the information representative of a membership can be assigned to the controller electronically. Controllers can also determine autonomously their information representative of a membership. For instance, a power supply may issue along the cabling a signal indicating to the connected controllers a certain information representative of a membership. Also, controllers may vary their amperages during initialization, in a certain pattern and all controllers being connected to the same cabling may measure this pattern in amperage and may detect their membership to a certain group.

According to an embodiment, the first value is sent by the motor-roller controller together with the information representative of the membership. This allows the receiving controllers to determine, whether the received second value is relevant or not. It may be the case that the communication links between controllers is different than the power cabling.

Thus, second values of controllers belonging to a second group may be received in a controller belonging to a first group. Such second values stemming from controllers belonging to different groups may be discarded in the receiving controller.

According to an embodiment, only those second values received together with the information representative of the membership, which corresponds to the assigned information representative of the membership, are used for determining the nominal value. As explained, the nominal value is used to prevent undervoltages and/or overcurrents. The nominal value allows for each controller to adjust its amperage e.g. the amperage output at the motor-roller control port, such that the overall current within a group can be limited without degrading the overall performance of the conveyor line.

Depending on various parameters, for instance a power limit of the power supply, cabling cross-section, length of cabling etc, a limit value for a sum of first and second values of all motor-roller controllers being assigned to a common group can be determined. The limit value can be such that virtually no overcurrent occurs within a group.

The limit value can be determined manually. In particular when setting up the conveyor system, the parameters detrimental of the limit value can be determined and the limit value can be calculated. The limit value can be also be determined automatically. The limit value can be set within the controllers manually or communicated to the controllers.

Not only the first and second values and in particular their sum is relevant for the nominal value, but also, the nominal value can, in particular in addition, be determined depending on the limit value. The nominal value can be determined dynamically, e.g. within consecutive time intervals. A relative and/or absolute difference between the sum of the first and second values and the limit value may be indicative for the nominal value. Also, the gradient of the relative and/or absolute difference between the sum of the first and second values and the limit value may be indicative for a gradient in the nominal value.

For at least one controller, a preferably individual correction factor may be set, indicating the coupling between the nominal value and the above described difference. That is, some controllers may be set to be more responsive to changes in the difference than others. For instance, some controllers control motors being more important for the functioning of the conveyor line than others. These have a lower correction factor than controllers which are less important for the functioning of the conveyor line.

According to an embodiment, the nominal value is determined by a processor of at least one motor-roller controller within a common group. That is, at least one of the controllers within the group may be responsible for determining the nominal value for at least one other motor-roller controller in the group, in particular for all motor roller controllers in the group. However, the nominal value may also be determined individually by a processor of a motor-roller controller for this individual controller. Like first values, also nominal values may be communicated within the group.

A nominal value for one controller within a group may depend on nominal values of other controllers within the group. In particular, the sum of the nominal values within the group shall be less than the limit value for the group. Thus, also the sum of the nominal values within the group may be relevant for a nominal value of a controller within the group.

According to an embodiment, a current slope for changing the value of the output current to the motor-roller in the direction of the nominal value is determined depending on the first value, the second value, the sum of the first and second values and/or the limit value. Moreover, the slope may depend on the sum of the nominal values of the group. In order to control the sum of the currents within the group, it is preferred if the current slope is controlled. The current slope may be controlled such that the slope of change of the sum of currents is damped.

According to an embodiment, a current slope for changing the value of the output current to the motor-roller in the direction of the nominal value is determined by a P, PD, PI or PID controller using the difference between the first value and the nominal value.

According to an embodiment, the nominal value may be calculated for each motor roller controller within a group identically. It may be that some motor roller controllers, e.g. these that control mergers and diverters, are not part of the calculation of the nominal value, i.e. they are fed with current without a limitation a described herein. All other motor roller controllers may have the same calculation of their nominal value.

The nominal value and the slope of the nominal value, e.g. the current slope of change of the nominal value, may depend on the number of motor roller controllers within a group, in particular a number of motor roller controllers within a group that participate in the current limitation as described herein.

The change of nominal value may be linear or non-linear. Depending on the application of a certain motor roller controller within the conveying line, the change of nominal value may follow a linear slope or non-linear slope.

According to an embodiment, a motor-roller controller is assigned a priority out of at least two different priorities. Like the coupling factor, a priority may be used to differentiate between controllers. Some controllers may be more relevant for the functioning of the system than others. Also, some controllers control conveyor lines, which are more tolerant to changes in their current than others. For instance, a merger or a diverter is highly susceptible to changes in currents with regard to the functioning of the conveyor line. That is, mergers and diverters, as an example, should possibly not have limitations by nominal values to their currents, or at least should be limited in current as the last controllers within a conveyor system. Thus, they can have a higher priority than conveyors along a conveyor line. With less current, the goods are transported at a lower speed, however, the conveyor line still operates.

As has been said, it is proposed that the nominal value is determined based on the assigned priority. For instance, controllers with high priority will be assigned nominal values lower than their required currents later than controllers with low priority. That is, in case the current within the group needs to be controlled, at first nominal values for controllers with a first, low priority, are determined and used in these controllers. Only if thereafter still the current within the group needs to be controlled, at first nominal values for controllers with a second, higher priority, are determined and used in these controllers.

According to embodiments, motor-roller controllers of a common group are powered from a common power supply. The common power supply has a certain current rating. The sum of the currents at the controllers shall not exceed this current rating.

As has been said, some controllers are more relevant for the functioning than others. It may be suitable to exclude one or more controllers at all from current control as explained, using the nominal values. Therefore, it is proposed that at least one motor-roller controller within a common group is configured not to limit its first value into the direction of a nominal value.

An upper limit of the nominal value of a current for a motor may be the maximum allowed current for the motor. A lower limit for the nominal value for a motor-roller controller may be such that the current to the motor-roller is higher than a minimum required value to causes the motor-roller revolve. By this, it is ensured that the rollers still revolve, at lower speed, but the conveyor line is still operative.

In order to facilitate communication between the motor-roller controllers of different common groups, they may be connected to a same serial bus.

It may be possible to maintain a list of controllers within a group in each controller. Using this list, it is possible to determine, if a received second value is relevant for the group or not, if, according to embodiments, second values are received together with a unique identification of the corresponding motor-roller controller. This unique identification can be compared to those stored in the list and it may thus be determined, if the corresponding second value is relevant. The unique identification can be depending on a MAC address of a communication module within a controller. It may be composed of the MAC address, parts of the MAC address or a value determined from the MAC address.

According to embodiments, within a motor-roller controller a list with all second values received together with the information representative of the membership to the common group is stored. This allow the controller to determine the nominal value by using, in addition, at least its own first value.

To prevent excessive traffic on the communication channel, e.g. the communication bus, first values should be communicated rule based. Thus, it may be possible to send the first value depending on an absolute value of a change of the first value. For instance, only if the absolute change of first value is higher than a threshold, the first value may be send. In such a case, received second values of controllers are valid as long as a new second value is received.

It may be possible to send the first value depending on a relative value of a change of the first value. For instance, only if the relative change of first value is higher than a threshold, the first value may be send. In such a case, received second values of controllers are valid as long as a new second value is received.

The first value may in each case be compared with the first value sent the last time. This sent first value may be stored in the controller as long as a new first value is send. The absolute and/or relative change of the first value may be determined from the instant determined first value and the stored first value. The absolute and/or relative change may be compared with a threshold and if above such a threshold, the value may be sent.

A derivative of the first value may also be determined. It may be possible to send the first value when its absolute derivative is above a threshold. In such a case, the motor current undergoes a steep change, which might require instant action, i.e. setting nominal values to reduce the sum of the currents in a group.

According to embodiments, the threshold values for comparison may be different for different controllers. For example, a motor-roller controller may be configured with an individual threshold value and/or that at least two controllers of a common group are configured with a common threshold value. This allows for fine tuning the system. Moreover, the threshold may be different depending on the sign of value of change and or derivative. For example, with currents values that drop, it may be preferred that in these cases the nominal values are changed slower that in cases of currents values that rise. Thus, the threshold for negative values of change may be higher than the threshold for positive values of change or vice versa.

A motor-roller controller may be configured as master controller or slave controller. Within a master controller, the above described calculations may be carried out for slave controllers and the results of the calculations may be send to the slave controllers. This reduced the need for "intelligent" controllers within a conveyor system.

In order to ensure that the controllers are active in current control, a "keep alive" functionality should be provided. For instance, the first value may be sent depending on a lapsed time since a preceding sending of the first value. Other controllers may thus monitor, if they receive within such time intervals second values, which indicate that the controller which has send this value is still alive. It controllers do not receive second values within the prescribed time interval of one other controller, they may issue a warning signal.

BRIEF DESCRIPTION OF THE DRAWINGS

These and other aspects of the subject matter will be explained more detail with reference to the following figure. In the figure show.

DETAILED DESCRIPTION OF THE INVENTION

Figure 1:
FIG. 1 is a motor-roller-controller according to embodiments.
Figure 1:
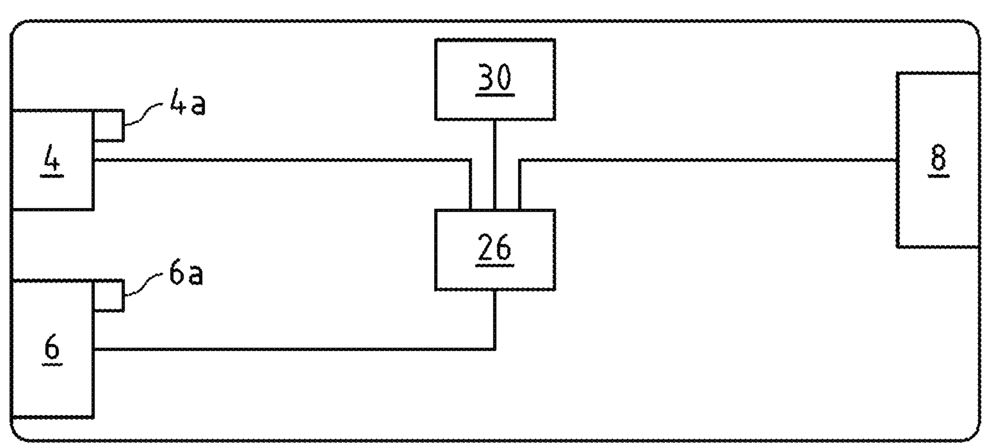

FIG. 1 shows a conventional wired motor-roller controller 2 for motor-rollers. The controller 2 has a power inlet 4. The power inlet 4 (input power port) is a DC-power inlet 4, in particular 12V or 24V power inlet, may however also be an AC inlet. Power inlet 4 receives the electric power for operating the controller 2. The power inlet 4 may also receive the electric power for operating a motor-roller.

A motor-roller can be connected to a motor-roller control port 6. Motor-roller control port 6 has at least two, preferably four connectors for connecting the motor-roller. Via the motor-roller control port 6 the motor-roller may at least be supplied with electrical energy. In addition, the motor-roller may be controlled by exchanging control signals and/or status information signals via the motor-roller control port 6. Control of motor-rollers as such is well known and will not be described in more detail.

Finally, controller 2 has an I/O-port 8. I/O-port 8 can be a communication port for wired and/or wireless communication, for instance according to an industry standard, in particular as mentioned above. Moreover, I/O-port 8 can support any proprietary protocol. Via port 8, control signals and/or status information can be exchanged between the controller 2 and a central control center.

The controller 2 further has a central processor 26 which is connected to the power inlet 4, the motor-roller control port 6 and the I/O-port 8. The central processor 26 can be programmed. The programming may be understood as setting parameters for the motor-roller. According to the programming, the motor-roller is instructed via motor-roller control port 6 to at least rotate in a certain direction at a certain speed. Any other parameters as described above can be parameterized and programmed. The processor 26 can be programmed to operate according to any of the methods disclosed herein.

It is possible to set the parameters of controller 2 and read out status information from controller 2 via port 8. In addition, controller 2 may have a memory 30.

During operation, central processor 26 outputs control signals for a motor-roller via motor-roller control port 6. The signals output, the amperage as well as the voltage of the output signals and the like depend on settings (parameters) of controller 2, which are according to the methods described herein. In particular, processor 26 may be programmed to obtain first values from amperage sensors. Moreover, during operation, central processor 26 reads out status information from the motor-roller via motor-roller control port 6.

An amperage sensor (meter) 4*a* may be arranged at the power input port 4. Also, in addition or alternatively, an amperage sensor (meter) 6*a* may be arranged at the motor-roller controller 6. The amperage for the first value and/or the second value can be measured by either sensor 4*a* or sensor 6*a*. Also, both sensors 4*a*, 6*a* may measure an amperage. The first and/or second value can be determined from an arithmetic or geometric mean of these values. It may also be possible to measure the amperage for a certain time span and then calculate an arithmetic or geometric mean of these values as first and/or second value.

Figure 2:
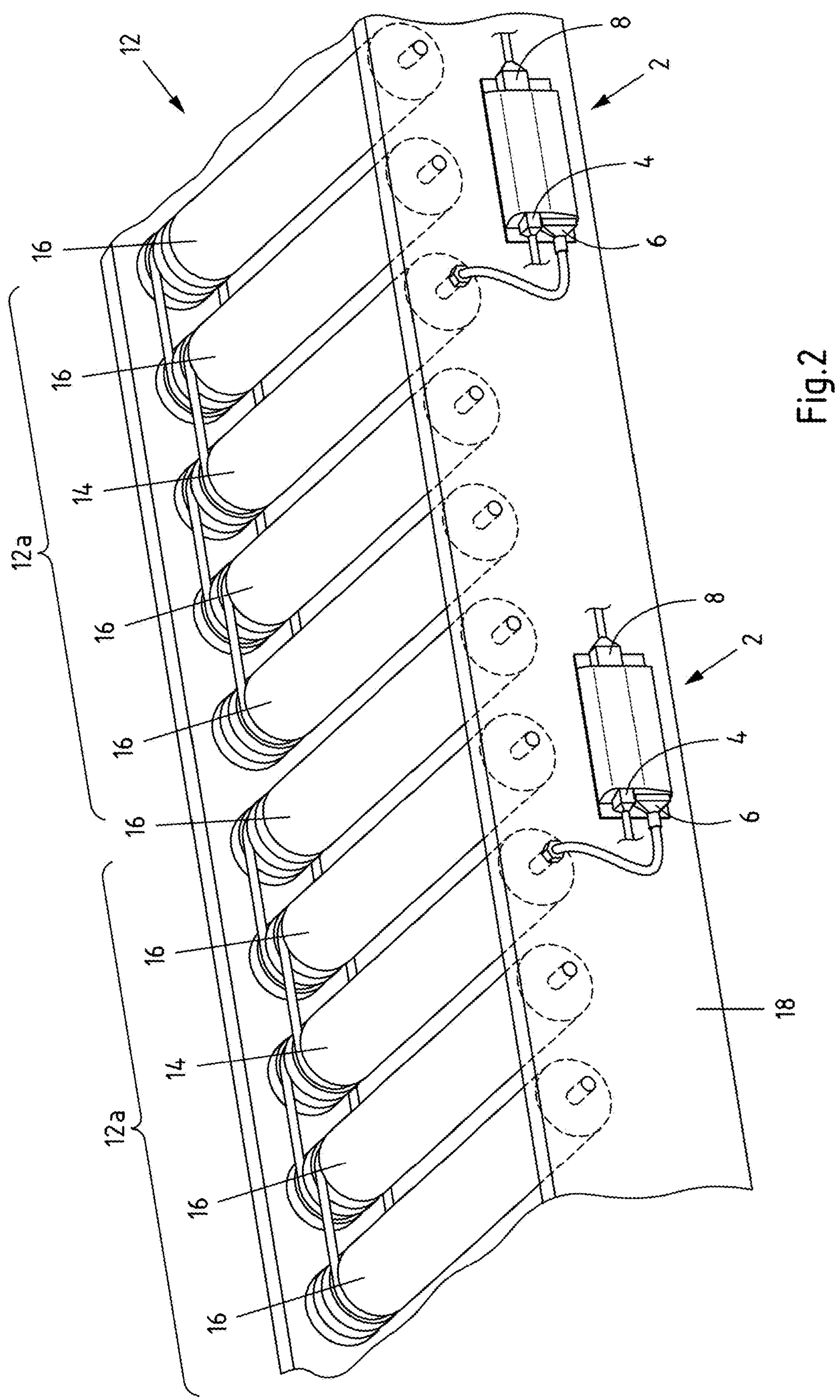
FIG. 2 is a conventional conveyor according to an embodiment.

A conventional conveyor as illustrated in FIG. 2 may comprise motor-rollers 14 and rollers 16. A conveyor line 12 may have two or more conveyor zones 12*a*. Within each conveyor zone 12*a*, one motor-roller 14 is mechanically coupled with at least one, preferably between two to seven rollers 16, in particular by V-belts or poly-V-belts or the like. Other mechanical couplings are also possible.

A motor-roller 14 is rotatable arranged on a rack 18 and comprises a motor within a hollow tube. The motor within the hollow tube is connected to the controller 2 via its motor-roller control port 6.

For each of these zones 12*a*, a separate controller 2 is provided controlling the respective motor-roller 14. The controllers 2 are connected to power and a control bus via their power inlets 4 and I/O-ports 8.

Figure 3:
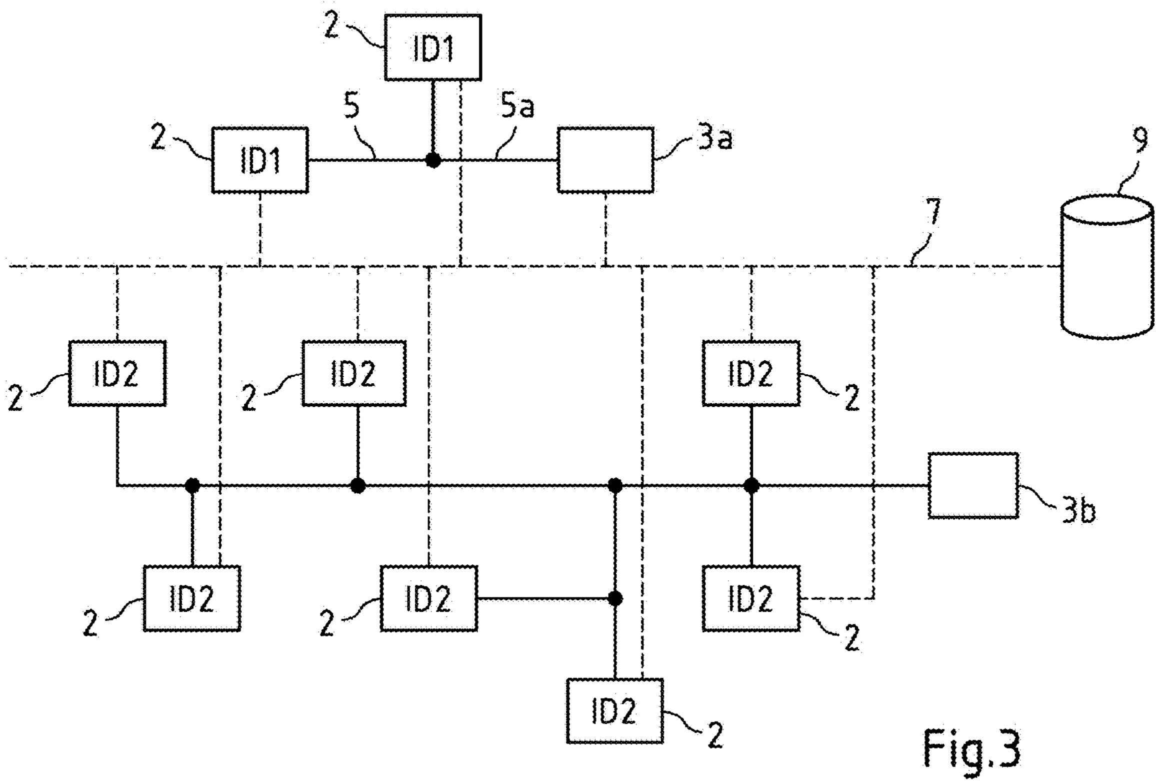
FIG. 3 is a conveyor system comprising a plurality of controllers according to an embodiment.

FIG. 3 depicts a conveyor system with a plurality of controllers 2. Each controller is connected to a power bus via a cable 5. Each power bus is powered by a power supply 3. Undervoltages may occur due to Ohmic losses along the cables 5 due to overcurrents. Also, the rated power of power supply 3 may be less than the power drawn by all controllers 2 connected via the same power bus to the power supply 3.

As can be seen, controllers 2 are in communication connection via a communication bus 7. Communication bus 7 can be connected to I/O ports 8. It may be possible that controllers 2 of different power busses are in communication connection via the same communication bus 7. Communication bus 7 may connect the controllers 2 to a central controller 9. Communication bus 7 may be wired or wireless, as defined above.

It is proposed, that the first values of amperages used by a controller 2 are stored in controller 2 as values A and send out by this controller as a value B. The controllers 2 may receive various values B1, B2, . . . Bn, with n being the number of controllers 2 connected to the same power bus.

The controllers 2 may have a synchronized time bases. The controllers 2 may obtain first and/or second values within time intervals. Either a value is obtained at the end of a time interval or a threshold value of the obtained value has reached. The threshold value can for instance be an absolute amount of change of value, a relative amount of change of the value, a slope of the value, a threshold of an absolute or relative value of a derivative of the value over time, etc.

Figure 4:
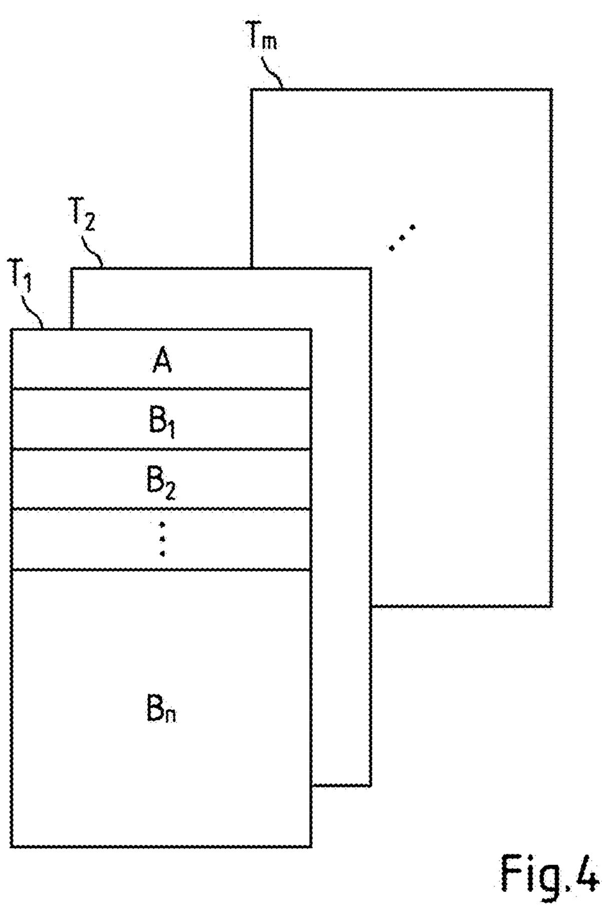
FIG. 4 is a storage according to an embodiment.

Within certain intervals T1, T2, T3 . . . Tm, with m being the number of intervals, the controllers obtain their first values A, send these out as values B and receive other values B. For each time interval, the controllers 2 may store the obtained and received values A, B in a storage as depicted in FIG. 4. It is possible that such a storing is applied in each controller 2, in certain master controllers 2 and/or in central controller 9. The following will describe the option of application in each controller 2, may however be understood as being relevant for any of the options. In the latter two options, however, the values calculated are send from the master controller 2 or central controller 9 to the other controllers 2.

Figure 5:
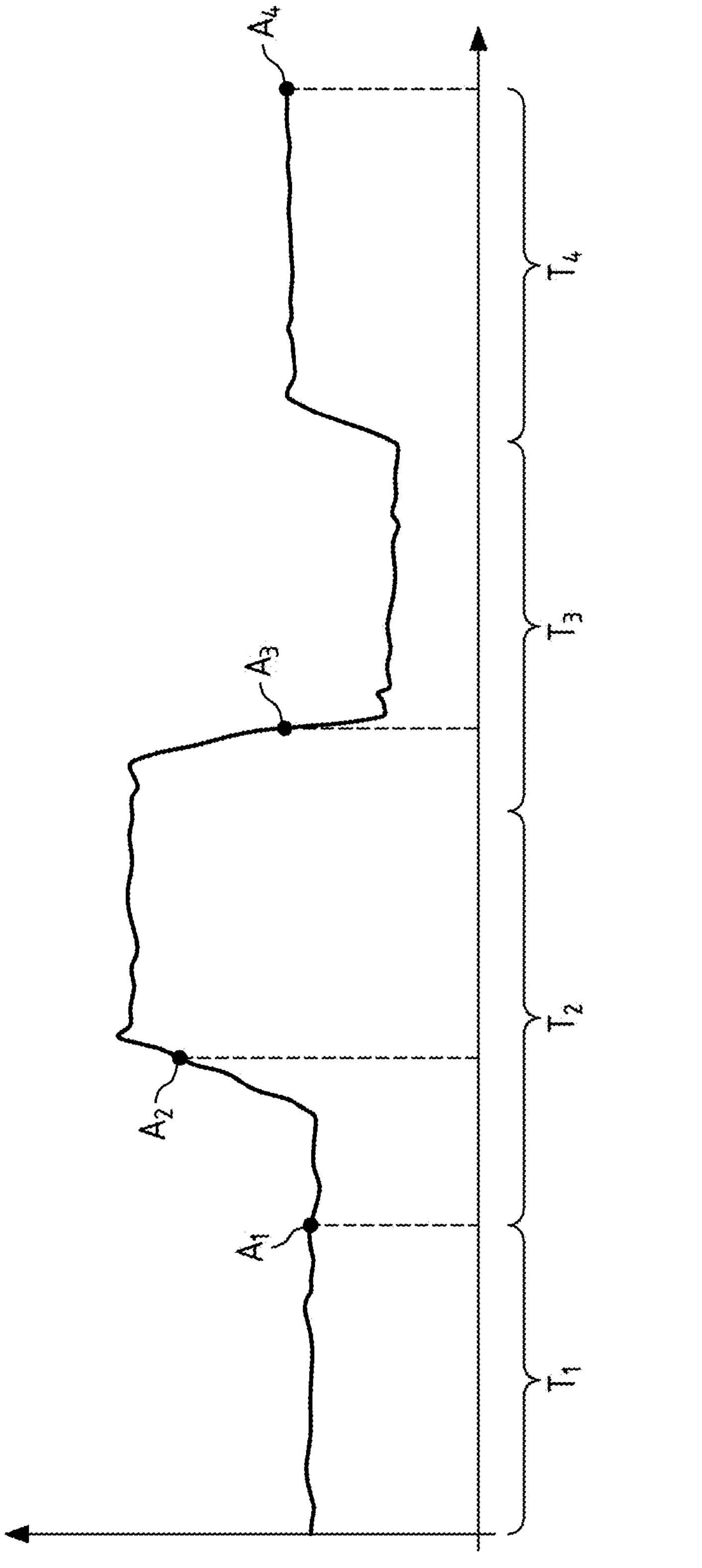
FIG. 5 is a schematic diagram of temporally varying values stored in and output by controllers according to an embodiment.

For instance, as depicted in FIG. 5, the time intervals T1 . . . Tm have equal lengths. They may also have varying lengths.

Within each time interval T, the sensors 4*a* and/or 4*b* obtain first values A. Within each time interval T or at the end of a time interval T, each controllers obtains and stores a first value A. The first values are either send at each end of a time interval T or once they are obtained, as second values B.

The controllers 2 thus receive within each time interval T, at least at the end of time interval T, second values B of other controllers. As has been explained above, the controllers are grouped into common groups. This may be done by assigning a group ID to the controllers. The second values B can be send together with the group IDs. A receiving controller 2 may evaluate if a received value B is assigned to a group ID which is the same as the group ID of the receiving controller 2. In that case, the received value B is stored, else, the received value B can be discarded. The group ID is depicted in FIG. 3. As can be seen, the controllers 2 being connected via a same power bus to power supply 3*a*, have group ID1, and controllers 2 being connected via a same power bus to power supply 3*b*, have group ID2.

At the end of the time interval T or on an ongoing basis, each time a new value A is obtained or a new value B is received, the controller 2 may determine a nominal value for the amperage at the motor-roller control port 6 or at the power inlet 4.

As can be seen in FIG. 5, the value A1 has is obtained at the end of interval T1. The reason is that within time interval T1, the measured value did not change significantly. During interval T2, however, the measured value changes substantially. The absolute amount of change in value compared to the last obtained value A1 may be decisive for obtaining value A2. If, during interval T2, the measured value would again change substantially, e.g. more than a threshold, compared to the value A2, in interval T2 a new value A2*x* would be obtained.

Since in time interval T2 value A2 is obtained, at the end of the interval T2 no new value is obtained in order not to increase communication traffic.

At the beginning of time interval t3, the value changes again substantially compared now to the last value A2, and a new value A3 is obtained.

In time interval T4, there is no substantial change and thus, at the end of interval T4, a new value A4 is obtained.

Values A1-A4 are stored in controller 2 and send as values B1-B4 to other controllers within the common group.

This nominal value may first be determined based on the first and second value A,B being current, i.e. the ones which have been received at the latest.

In may be advantageous if a controller 2 is aware of the number of controllers 2 within the same group, in order to determine if for all controllers 2 in the group a value B is available.

With the values A and B, the controller 2 may calculate a sum.

In addition, a controller 2 may be aware of a limit value of the group. The limit value may, for instance, be set for the group. For instance, the limit value may Within each time interval T, in particular at the end of time interval T, the controller 2 calculates from the current values A, B a sum.

The sum can be compared with a limit value. The limit value for the group may depend on the rated power of power supply 3*a, b* and/or information on the cabling 5*a,b*, the infrastructure or the like.

If the sum reaches the limit value, a current limitation strategy as described above may apply individually for a controller 2 (individual) or common for at least two controllers 2 (common) within a group.

First of all, for an individual or common controller 2, a lower threshold for the amperage may be set. This may be a value for the amperage at which the motor still works, but revolves slower. This ensured operation of the conveyor system.

Then, an individual or common nominal value may be set. The nominal value may be an upper limit of the amperage. The nominal value may be fixed or set dynamically depending on the sum.

The nominal value may be used to limit the amperage of a controller 2 compared to the current measured value A. The nominal value usually is lower than the current value A.

If the sum is above the limit, it may be checked if the current value A is above the nominal value. If not, the amperage of the controller 2 is not changed. If the current value A is higher than the nominal value, the amperage if the controller 2 is changed towards the nominal value.

It may be advantageous, if the slope of change is set individually or common. The slope may determine the rate of change of the amperage.

It may be possible to determine, depending on the limit value and the second values, a nominal value. It may be possible to determine the nominal value dynamically once the sum is above the limit value. Then, it may be checked, if the reason for the sum being above the limit value lies in the actual controller 2 or other controllers. Thus, it may be determined, what the sum of the second values B is. If the sum of the second values is within a range of the limit value, i.e. a distance is less than the lower threshold, the reason for the overcurrent may be in the other controllers 2. Then, no nominal value is set individually. However, if the sum of the second values B has a distance from the limit value above the said threshold, the reason for the overcurrent may be in the actual controller 2. Then, a nominal value is set.

However, it should be noted that the nominal value may be set once the sum of A and B is reached or overshoots the limit value.

The nominal value may be set for a common group of controllers. That is, depending on what type of motor-roller or conveyor line is controlled by a group, the nominal value may differ. For instance, there may be controllers 2, which control merger, diverter or the like. These shall not be limited in current, i.e. they have no set nominal value. Other controllers 2, may be more important, for which reason the nominal value is higher than for "normal" controllers 2.

It may be possible to assign priorities to controllers 2. In such a case, once the sum reaches the limit, the controllers 2 with lowest priority are first assigned a nominal value. In that case, some first controllers 2 may change their amperage. If at the end of the time interval, it may be checked if the sum is lower than the limit. If so, the controllers 2 with the next higher priority set a nominal value. This will be continued until the last priority or the sum is less than the limit.

It may also be possible to assign a coupling factor for a controller 2. That is, the higher a coupling factor, the steeper the slope of change of amperage towards the nominal value. This results in that some controllers 2 may react faster and may change their amperages faster if necessary than others.

With the above method, it is possible to change the amperage of a group once the overall current in the group exceeds a limit value. It may then be possible to individually or commonly change the amperage, the absolute value of the amperage, the slope of amperage and the like for a controller 2. This results in the conveyor system to operate even if the amperage of the system would usually exceed the rated power of the power supply. The amperages are changed to a lesser degree than turning the controllers 2 off in case of overcurrent. The controllers still operate the motors, however, possibly with a current sufficient for operation, but less than usual.

It should be noted that the use of a term in singular may be understood a comprising the plural and vice versa. It should be noted that the term "and" may be understood as "or" and vice versa. It should be noted that any enumeration shall be considered non-exhaustive.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for operating a motor-roller controller wherein a first value indicative of an amperage at an input power port of a first motor-roller controller is measured by a meter of the first motor-roller controller, the first value is sent out from the first motor-roller controller to at least one second motor-roller controller, at least one second value indicative of an amperage at an input power port of the at least one second motor-roller controller is received at the first motor-roller controller, a nominal value for the amperage at the input power port of the first motor-roller controller is determined depending on the first value and the at least one second value, and the motor-roller control port of the first motor-roller controller is operated with an output current to the motor-roller such that the amperage at the input power port reaches the nominal value.

2. The method according to claim 1, wherein the first value indicative of an amperage at the input power port of the first motor-roller controller is measured at the motor-roller control port of the first motor-roller controller and/or second value indicative of an amperage at the input power port of the second motor-roller controller is measured at the motor-roller control port of the second motor-roller controller.

3. The method according to claim 1, wherein information representative of a membership of the first motor-roller controller to a common group, in particular a group ID of the common group, is assigned to the first motor-roller controller and/or information representative of a membership of the second motor-roller controller to the common group, in particular the group ID of the common group, is assigned to the second motor-roller controller and/or the first value is sent by the motor-roller controller together with the information representative of the membership and/or the at least one second value is received at the motor-roller controller together with the information representative of the membership.

4. The method according to claim 3, wherein only those second values received together with the information representative of the membership, which corresponds to the assigned information representative of the membership, are used for determining the nominal value.

5. The method according to claim 1, wherein a limit value for a sum of first and second values of all motor-roller controllers being assigned to a common group is determined and/or the motor-roller controllers of a common group are configured with the limit value.

6. The method according to claim 1, wherein the nominal value is determined depending on the limit value and the at least one second value, and/or the nominal value is determined by a processor of at least one motor-roller controller within a common group.

7. The method according to claim 1, wherein a current slope for changing the value of the output current to the motor-roller in the direction of the nominal value is determined depending on the first value, the second value, the sum of the first and second values and/or the limit value and/or a current slope for changing the value of the output current to the motor-roller in the direction of the nominal value is determined by a P, PD, PI or PID controller using the difference between the first value and the nominal value.

8. The method according to claim 1, wherein a motor-roller controller is assigned a priority out of at least two different priorities and/or the nominal value is determined based on the assigned priority.

9. The method according to claim 1, wherein motor-roller controllers of a common group are powered from a common power supply and/or at least one motor-roller controller within a common group is configured not to limit its first value into the direction of a nominal value.

10. The method according to claim 1, wherein the nominal value for a motor-roller controller is such that the current to the motor-roller is higher than a minimum required value that causes the motor-roller revolve.

11. The method according to claim 1, wherein the second values are received together with a unique identification of the corresponding motor-roller controller.

12. The method according to claim 1, wherein within a motor-roller controller a list with all second values received together with the information representative of the membership to the common group is stored.

13. The method according to claim 1, wherein the first value is sent depending on an absolute value of a change, a relative value of a change compared to a preceding sending of the first value or a derivative of the first value and/or the first value is send depending on a lapsed time since a preceding sending of the first value and/or the value of a change or the derivative is compared with a threshold value.

14. The method according to claim 1, wherein a motor-roller controller is configured with an individual threshold value and/or that at least two controllers of a common group are configured with a common threshold value.

15. The method according to claim 1, wherein the first value is sent out from a signal bus port of the first motor-roller controller.

16. The method according to claim 1, wherein the second value is sent out from the second motor-roller controller, in particular from a signal bus port of the second motor-roller controller.

17. The method according to claim 1, wherein the nominal value for the amperage at the input power port of the first motor-roller controller is determined in the first motor roller controller or a central controller depending on the first value and the at least one second value.

18. The method according to claim 1, wherein the first and the second values are received at a central controller.

19. A motor-roller controller configured to operate according to the method of claim 1.

20. A conveyor system, for instance for conveying goods, packages and the like comprising at least two motor-roller controllers according to claim 19 and a common power supply.

* * * * *